Nov. 18, 1930. F. H. WRIGHT ET AL 1,782,084
MEAT MINCING AND SAUSAGE MEAT MAKING MACHINE
Filed Jan. 12, 1927  2 Sheets-Sheet 2

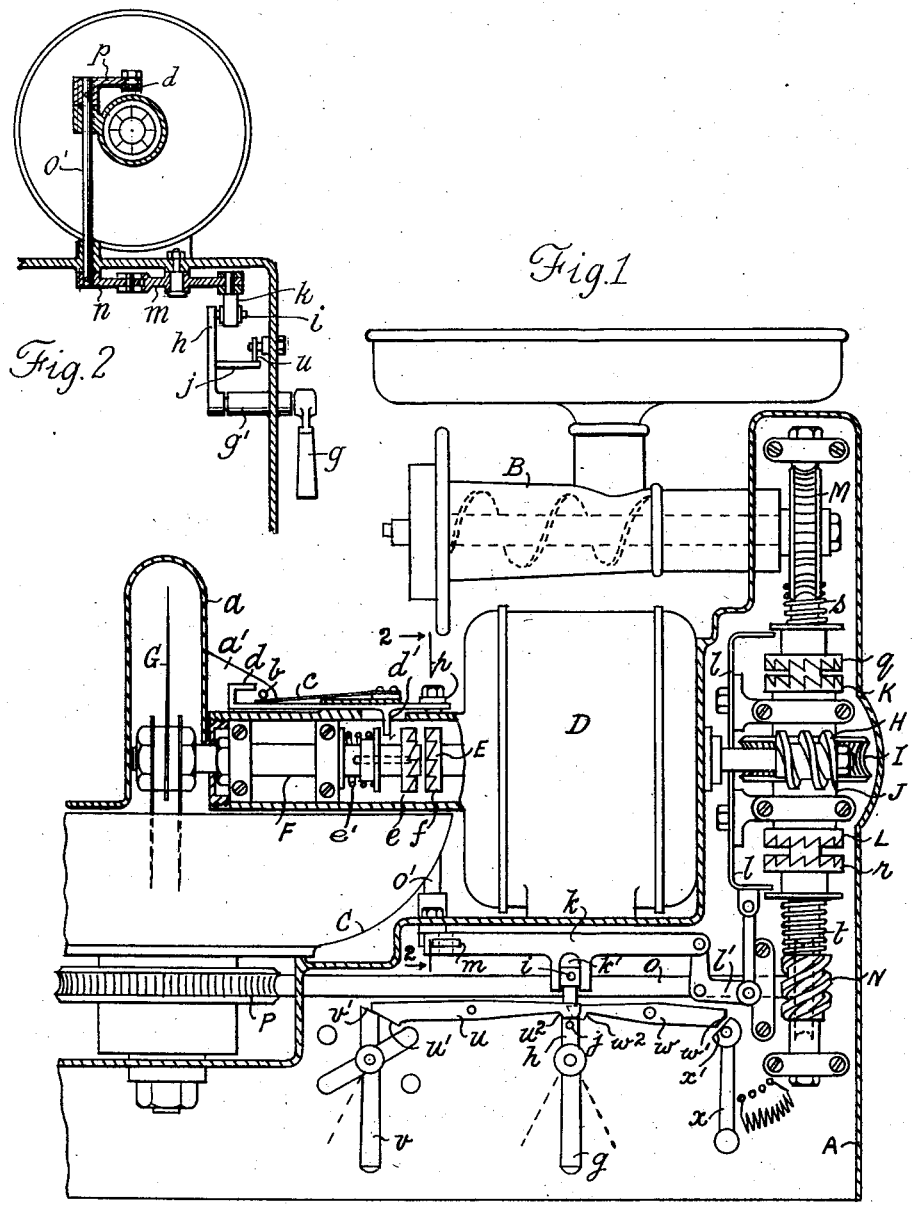

Inventors
F. H. Wright
E. W. Lewis.
BY

Patented Nov. 18, 1930

1,782,084

UNITED STATES PATENT OFFICE

FREDERICK HURSH WRIGHT AND EDMUND WOODWARD LEWIS, OF LONDON, ENGLAND

MEAT-MINCING AND SAUSAGE-MEAT-MAKING MACHINE

Application filed January 12, 1927, Serial No. 160,725, and in Great Britain April 16, 1926.

This invention relates to machines for preparing sausage-meat and of the kind comprising knives revolving in a rotating bowl with or without a mincer, for preliminary treatment of the meat, mounted on the same framing.

In preparing meat for sausages, it is usual to pass the meat first through a mincer, whence it is removed to a rotating bowl or silent cutter in which knives revolve at high speed, by which means the minced meat is reduced to a pasty consistency. The revolving knives are almost invisible and consequently very dangerous.

The invention has for its objects the prevention of accidents to those operating the machines, and the elimination of risk of damage to the machines through improper handling.

These objects are accomplished by the provision of safety devices whereby the person operating the machine is protected from contact with the revolving knives and cannot open the machine for charging or to remove the prepared food until the knives are stationary; further, power cannot be applied until the machine is properly closed and the knives guarded; and still further, the various clutches and gears for the mincer and silent cutter, when both are mounted on the one machine, cannot be operated simultaneously, or at the wrong time, or whilst the machine is working. All these safety devices co-operate and interact in the one machine.

According to this invention, the bowl is provided with a movable guard or cover having an arm provided with a lug co-acting with a catch which locks the cover in place and controls a clutch or gear between the power shaft and knife spindle. The catch may be a sliding bolt and is operated by a linkage from a main control lever. The switch is controlled by a trip lever also operated by the main control lever. By this means power cannot be applied to the knives unless the bowl guard or cover is in its proper position and fastened by the sliding bolt.

Moreover, before the guard or cover can be removed from the bowl, the switch must first be returned to its off position, thus cutting off the power and unlocking the main control lever which can then be turned to release the sliding bolt or catch and positively de-clutch the knife spindle.

Further, to prevent the various clutches and gears from being operated at the wrong time or whilst the machine is working, the control lever is furnished with a pin co-acting with the trip lever, the trip lever has a cam engaging the switch handle, and the linkage which operates the sliding catch on the bowl cover and the responsive clutches for driving the rotating bowl and the mincer is connected with the control lever in such a manner that only one set of clutches can be operated at a time, and all the other moving parts of the machine are locked at safety positions.

In order that the general arrangement of the invention and the assembly and co-operation of the various parts may be more clearly understood, reference is made to the accompanying drawings in which:—

Fig. 1 shows an elevation partly in section of a machine comprising a mincer and a silent cutter both driven by an electric motor through clutches.

Fig. 2 shows in sectional end elevation on line 2—2, Fig. 1, the linkage for actuating the sliding bolt or catch.

Figure 3:
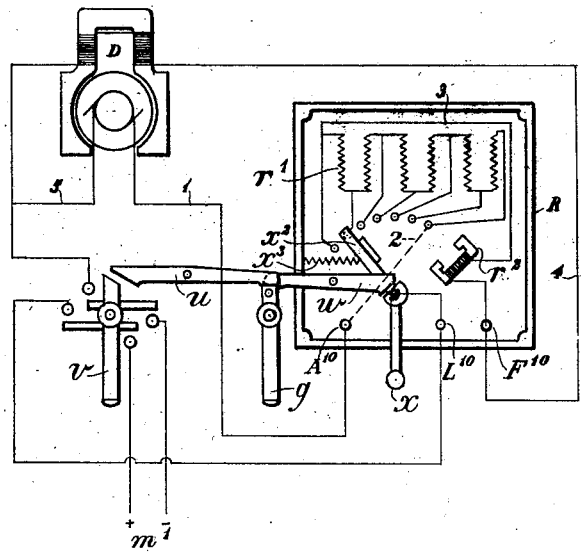
Figure 3 is a view showing diagrammatically a rheostat of ordinary pattern with the electrical connections adapted for use in connection with the machine of the present invention.

On the framing A is mounted a mincer B, a rotating bowl or silent cutter C, and a motor D. At one end of the motor shaft is a clutch E for driving the spindle F carrying the knives G of the silent cutter, and at the other end of the motor shaft is a worm H gearing with a worm wheel I on a shaft J which carries two clutches K, L, the former clutch K for driving the mincer through a worm wheel M and the latter clutch L for driving the rotating bowl through worm gearing N, shaft O and worm gearing P.

A movable guard or cover $a$ adapted to fit the bowl C and enclose the knives G is provided with an arm $a^1$ carrying a lug or pin $b$, and mounted on the framing is a sliding bolt or catch $d$ hook-shaped or slotted to move over the pin $b$ when the guard or cover $a$ is in its correct position and thereby lock the guard or cover to the casing. When the guard is removed and the catch $d$ therefore in the position shown, a spring $c$, normally depressed by the pin $b$, rises and engages the upper part of the catch $d$ and locks it in the open position.

The catch $d$ is formed with a projection $d^1$ which controls the movable portion $e$ of the clutch E and permits the two jaws $e, f$ of the clutch to engage, through the medium of spring $e'$, when the catch $d$ is moved over the pin $b$, the guard or cover being then in position and the silent cutter ready for operation. The locking means, therefore, actuates the clutch to open position when moved to release the cover and the spring $e'$ acts as an independent means to insure a clutching cooperation on movement of the locking means to lock the cover.

The movement of the catch $d$ is effected by a main control lever $g$, pivoted to the frame at $g^1$ and having an arm $h$ which carries a pin $i$ engaging a sliding block in a fork or slot $k^1$ in a link $k$. One end of the link $k$ is connected by a rocker $m$, Fig. 2, to a crank $n$ on a vertical shaft $o^1$ which has a second crank $p$ pivotally connected to the sliding bolt or catch $d$. The other end of the link $k$ is connected by a bell-crank lever $l^1$ to a slider $l$ controlling the clutches K, L.

It will be noticed that only one of the two clutches K, L can be driven at any one time, but not both simultaneously.

The mechanism so far described would leave the motor running continuously, and as a further precaution against risk the trip lever $u$ is provided and co-acts with the control lever $g$ and switch handle $v$ in such a manner that the control lever $g$ cannot be moved to the off position unless the switch handle $v$ is also in its off position and the motor therefore stationary; and similarly the switch handle cannot be moved to the on position unless the control lever is in one or the other of the on positions.

For this purpose, the arm $h$ of the control lever $g$ is furnished with a pin $j$ on which rests one end of the trip lever $u$ and the other end of the trip lever has a cam face $u^1$ bearing against a cam surface $v^1$ on the switch handle. The switch handle is shown locked in its off position and can only be moved when the the trip lever $u$ is free to tilt, that is, when the control lever $g$ is moved into one or the other of its on positions shown in dotted lines. For example, suppose the lever $g$ be moved to the left, thus shifting the link $k$ to the right and disengaging clutch L and bringing clutch K into engagement. The pin $j$ on the extension arm $h$ moves to the right and leaves the trip lever free to be tilted by the switch handle when it is turned to its on position, and when thus tilted, the right hand end of the trip lever which is furnished with a cog $u^2$ prevents the return of the pin $j$ so that the control lever cannot be brought back to its off position until the switch handle is returned to its off position and the trip lever to the position shown. When the control lever is moved to the right and the pin $j$ therefore to the left, clutch L is engaged and clutch K disengaged, the trip lever is free to be tilted by the switch handle, and the right hand end of the trip lever drops over the pin $j$ when the switch is moved to its on position and prevents the control lever from being returned to the off position until the switch handle is again moved back to its off position. It will be noticed that the end of the trip lever near the pin $j$ is bevelled or cam shaped in two directions to form a double-faced cog or stop.

The mincer B may be omitted. In this case, the clutch K would also be omitted, and the slider $l$ would then operate the clutch L only.

In working the machine and commencing with the mincer B, the control lever $g$ is moved to the left to put the clutch K into gear, and this movement unlocks the switch handle $v$ which can then be operated to start the mincer. Meanwhile the knives and bowl are stationary, and the cover can be removed ready for charging the bowl, and the meat can be minced directly into the bowl. When sufficient meat has been minced, the handle $v$ is returned to its off position. The return of the handle $v$ to its off position automatically unlocks the lever $g$ so that it also may be returned to its off position thereby again locking the switch handle $v$ by the lever $u$. The guard or cover $a$ may now be closed and the pin $b$ depresses the spring $c$. The lever $g$ is now moved to the right to put the clutches L, E into gear and actuate the linkage $k$ $m$ $n$ $o$ $p$ to slide the bolt $d$ over the pin $b$ and lock the cover $a$ in place; this movement also unlocking the switch handle $v$ so that the knives and bowl may be driven, and the trip lever $u$ locks the control lever $g$ in its on position to the right. When the meat in the bowl has been reduced to the desired pasty consistency, the switch handle $v$ is moved to its off position, thus unlocking the control lever $g$ which may then be brought to its off position; this movement releases the bolt $d$, the guard or cover can be opened, and the rising of the pin $b$ frees the spring $c$ which then rises and prevents the bolt from moving to the right.

When the power is cut off, the momentum of the moving parts may continue their rotation for an appreciable time, and as a still further precaution against opening the guard or cover until the motor has slowed or even stopped, a second trip lever is provided to co-act with a rheostat of usual construction and with the control lever $g$. The rheostat comprises a starting resistance and an ordinary electro-magnetic delay for retarding the release of the handle $x$ after the power is cut off. The trip lever $w$ is similar to the trip lever $u$, one end being shaped as a cam surface $w^1$ and the other as a cog $w^2$. The rheostat handle $x$ is provided with a flat faced cam or segment $x^1$ which, acting on the cam $w^1$, tilts the trip lever $w$, and the cog $w^2$ is brought down and locks the control lever $g$ in one or the other of its on positions in addition to the locking by the lever $u$. When the power is cut off the rheostat does not immediately return to its off position, but delays while the motor is slowing down and then returns automatically by a spring and unlocks the control lever $g$, which can then be brought to its off position.

Figure 3 shows the electrical connections as usually adopted for a rheostat of ordinary pattern, the resistance coils $r'$, electro-magnet $r^2$, and handle extension $x^2$ being housed in a casing R. The line terminal and motor armature and field terminals are indicated by the references $L^{10}$, $A^{10}$ and $F^{10}$, and the leads by the references $m'$.

Assuming the main switch $v$ to have been turned off as shown to stop the machine, the rheostat handle extension $x^2$ will still be retained over on the magnet $r^2$ by the current generated by the revolution of the armature, such current following the circuit of line 1 to terminal $A^{10}$, thence by line 2 to the coils $r'$, thence by line 3 to the magnet $r^2$ and terminal $F^{10}$, back by line 4 to the field winding of the motor, and finally by line 5 back to the armature. The lever $w$ is thus held locked while the motor is slowing down, but is freed when the handle extension $x^2$ is released by the magnet $r^2$ and is drawn back by its spring $x^3$.

By this invention, the mincer and silent cutter do not at any time operate simultaneously, accidental starting of the machine is made impossible, and safety in normal starting and stopping is ensured.

Having thus described our invention, what we claim as new and desire to secure by Letters Patent is:—

1. A machine for preparing sausage-meat and of the kind described, comprising a safety device consisting of a movable cover fitting over the bowl and knives, a lug or pin on the cover, a spring member depressible by the lug or pin when the cover is closed, a clutch on the knife spindle, and a hand-operated sliding bolt which in one position engages the lug or pin to lock the cover in place and effects engagement of the clutch on the knife spindle, and in the other position disengages the clutch and is automatically locked by the spring member when the cover is opened.

2. A machine for preparing sausage-meat and of the kind described, comprising a safety device consisting of a movable cover for the bowl and knives, a lug or pin on the cover, a depressible spring member co-acting with the lug or pin and with a sliding bolt controlling a clutch on the knife spindle, a main control hand lever operating the sliding bolt by a linkage, and a locking device associated with the main hand lever and the power switch in such a manner that the switch is locked in its off position when the sliding bolt is drawn back by the main lever to unlock the cover.

3. A machine for preparing sausage-meat and of the kind described, comprising a safety device consisting of a movable cover for the bowl and knives, a lug or pin on the cover, a depressible spring co-acting with the lug or pin and with a sliding bolt controlling a clutch on the knife spindle, a control hand lever operating the sliding bolt by a linkage, and a trip lever co-acting with the switch and the main control lever so that the switch is locked in its off position when the control lever is in its off position, and the control lever is locked in its on position when the switch is in its on position.

4. A machine for preparing sausage-meat and of the kind described, comprising a safety device consisting of a movable cover for the bowl and knives, a lug or pin on the cover, a depressible spring co-acting with the lug or pin and with a sliding bolt controlling a clutch on the knife spindle, a control hand lever operating the sliding bolt by a linkage, a trip lever co-acting with the switch and the main control lever to lock the switch off when the control lever is off, and to lock the control lever on when the switch is on, and a second trip lever co-acting with the main control lever and with a cam on a rheostat handle to lock the control lever on and the cover therefore locked down, after the power is cut off and until the rheostat returns to its off position.

5. A machine as in claim 3, in which the main control lever operates the clutch for driving the bowl.

6. A machine as in claim 4, in which the main control lever operates the clutch for driving the bowl.

7. A machine as claimed in claim 3, combined with a mincer driven by a clutch operated by the main control lever through a linkage in such a manner that either the mincer or the silent cutter can be brought into operation as desired, but not both mincer and silent cutter simultaneously.

8. A machine as claimed in claim 4, combined with a mincer driven by a clutch operated by the main control lever through a linkage which also operates the clutches for driving respectively the bowl and knives of the silent cutter, all operating in such a manner that the control lever has separate on positions for the mincer and silent cutter and an off position common to both mincer and silent cutter so that both cannot be brought into operation simultaneously.

9. A machine for preparing sausage meats and having knives, a cover for said knives, an operating means for the knives including a clutch, and means for locking and releasing the cover, a manually operable element for directly actuating the cover locking and releasing means, and a member carried by said locking and releasing means acting when said means is in cover releasing position to directly prevent normal clutch function and when said means is in cover locking position to permit normal clutch function.

10. A sausage meat preparing machine having knives, a cover for the knives, knife operating means including a clutch, manually operable locking means for the cover, said locking means positively actuating the clutch to open position when moved to release the cover and independent means to insure clutching operation on movement of said locking means to lock the cover.

11. A sausage meat preparing machine, including a power means, a cutter, a protecting cover for the cutter, a cutter operating shaft including a clutch, a lock for the cover, a manually operable control for the power means, and a manually operable element for simultaneously controlling said lock and said clutch, the manually operable element being locked against operation when the power means control is in a predetermined position.

12. A sausage meat preparing machine, including a mincer, a cutter, a power shaft, means for controlling the power for said shaft, means whereby the power shaft may be caused to operate the mincer or cutter at will, a cover for the cutter, means for insuring a locking of the cover when the power shaft is operated to drive the cutter, and a manually operable element for controlling the power shaft and cover locking means.

13. A sausage meat preparing machine, including a mincer, a cutter, a power shaft, means for controlling the power for said shaft, means whereby the power shaft may be caused to operate the mincer or cutter at will, a cover for the cutter, means for insuring a locking of the cover when the power shaft is operated to drive the cutter, and a manually operable element for controlling the power shaft and cover locking means, said manually operable element being held against movement while the power controlling means is set for power admission.

14. A sausage meat preparing machine, including a mincer, a cutter, a power shaft, means for controlling the power for said shaft, means whereby the power shaft may be caused to operate the mincer or cutter at will, a cover for the cutter, means for insuring a locking of the cover when the power shaft is operated to drive the cutter, and a manually operable element for controlling the power shaft and cover locking means, said manually operable element being operable only during a non-power set of the power controlling means.

15. A sausage meat preparing machine, including a power shaft, a power control therefor, a cutter, a cutter shaft operated from the power shaft and including a clutch, a cover for the cutter, a locking means for the cover, manually operable means for simultaneously controlling the locking means and connection between the power shaft and cutter shaft, and a controlling connection between said locking means and the clutch of the cutter shaft, the position of the power control governing the permitted movement of the manually operable means.

In testimony whereof we have signed our names to this specification in London, England, this 24th day of December, 1926.

FREDERICK HURSH WRIGHT.
EDMUND WOODWARD LEWIS.